April 9, 1968     K. L. WILKISON ET AL     3,377,456
AUTOMATIC HEAT CONTROLLED TUBE UNION REMOVAL TOOL
Filed July 1, 1965                                                 2 Sheets-Sheet 1

INVENTORS
KERMIT L. WILKISON
CHARLES A. HEADLEY
VICTOR E. PADILLA
JERRY D. TROLINGER
BY *Gravely, Lieder & Woodruff*
ATTORNEYS INVENTORS
KERMIT L. WILKISON
CHARLES A. HEADLEY
VICTOR E. PADILLA
JERRY D. TROLINGER
BY Gravely, Lieder & Woodruff
ATTORNEYS

United States Patent Office 3,377,456
Patented Apr. 9, 1968

3,377,456
AUTOMATIC HEAT CONTROLLED TUBE
UNION REMOVAL TOOL
Kermit L. Wilkison, St. Charles, Mo., Charles A. Headley, Alton, Ill., and Victor E. Padilla and Jerry D. Trolinger, St. Louis, Mo., assignors, by mesne assignments, to Aeroquip Corporation, Jackson, Mich.
Filed July 1, 1965, Ser. No. 468,768
6 Claims. (Cl. 219—7.5)

The invention described herein was made in the performance of work under a NASA contract and is subject to the provisions of the National Aeronautics and Space Act of 1958, Public Law 85-568 (72 Stat. 426; 42 U.S.C. 2451), as amended.

The present invention relates to tools useful for removing brazed coupling unions in tubing systems, and more particularly relates to portable hand tools for removing brazed coupling unions or stubs without excessive heating thereof.

The currently known tools for removing brazed on couplings or unions in tubing systems often cause undesirable surface oxidation, contamination and wear on the tubing as a result of excessive heat and loading during removal of the union. With these tools precise control over the heat and removal of the unions has been somewhat ineffectual.

The present invention overcomes the previous difficulties encountered with prior tools for removing brazed-on unions from tubes. Briefly, the invention utilizes a union removal tool having an automatic heat control system and an automatic pulling member which cooperate to control heating of the union to achieve a temperature just sufficient for melting the brazing material and allowing separation of the union from the tube and thereafter automatically stop further heating of the union. The automatic system includes a heat control circuit activated by a switch member incorporated in the pulling portion of the union removal tool. A preferred form of the present invention utilizes the brazing tool principles disclosed in a prior application of Schoppman, Ser. No. 306,870, filed Sept. 5, 1963, now Patent No. 3,240,912, and a prior application of Schoppman and Konecny, Ser. No. 231,984, filed Oct. 22, 1962, now abandoned, both applications assigned to the assignee of this application.

It is therefore, an important object of the invention to provide an easily operated, portable and compact tool having an automatic heat control for removing brazed-on tube unions.

Another object of the invention is to provide an improved tube union removal tool having a simple pulling device which not only removes the union under proper conditions, but also controls the heating operation on the union.

It is another object of the invention to provide a tube union removal tool which may be positioned around a tube union to be removed and then activated whereby the tool automatically heats the union to a temperature sufficient to melt the brazing material, separates the union from the tube, and thereafter interrupts the heaing cycle.

It is another object of the invention to provide an automatic union removal tool, which employs an automatic separating mechanism and heating control system, that is simple and easy to operate.

These and other objects and advantages of the invention will become apparent from the ensuing description and the appended claims taken in conjunction with the drawings, wherein:

Figure 1:
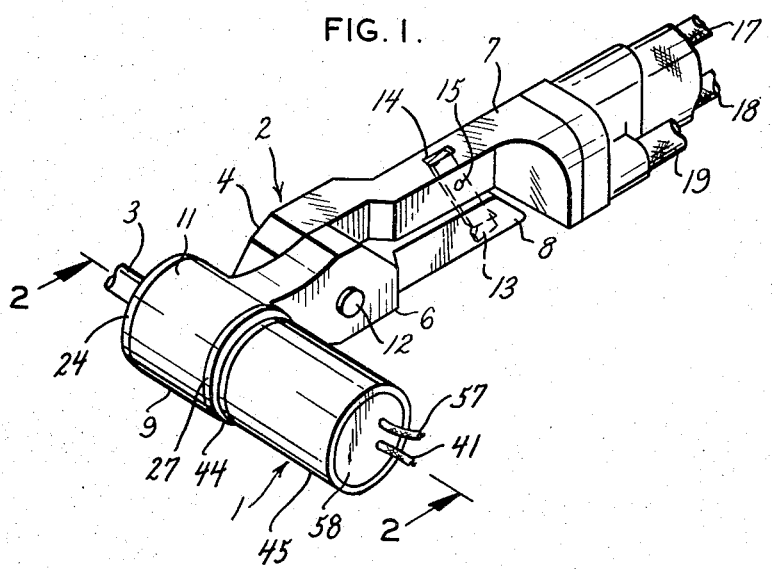
FIG. 1 is a perspective view of the union pulling components of the present invention.

With reference to FIG. 1, the composite tool includes a separate pulling component 1 and a heating component 2 applied to a tube 3. The heating component has two hingedly connected members 4 and 6 each of which has a handle portion 7 and 8, respectively, by which the tube engaging and enclosing jaw portions 9 and 11 are moved apart to receive the tube and thereafter are clamped upon the tube 3. The means 12 forms a hinge axis for the members 4 and 6. The members 4 and 6 are held together with the jaw portions 9 and 11 surrounding tube 3, by a catch member 13 mounted in a slot 14 and pivoted upon pin 15 in handle 7, so that heat may be applied to the coupling union 16 secured to tube 3 by brazing material from which another tube has been removed (not necessary to illustrate). More details of the precise coaction and structure of the heating component 2 is described in the prior application of Schoppman and Konecny, Ser. No. 231,984, previously noted.

Figure 2:
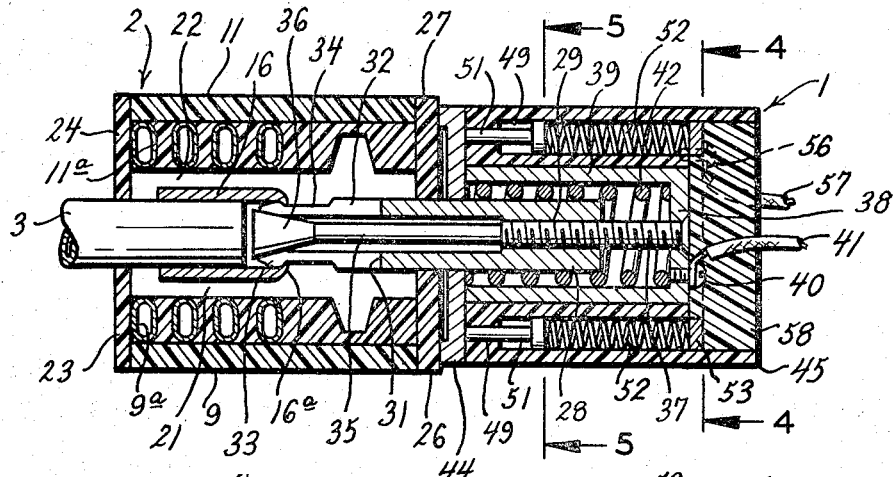
FIG. 2 is a longitudinal sectional view taken through the removal chamber and removal mechanism along line 2—2 in FIG. 1 illustrating a union ready for removal.
Figure 5:
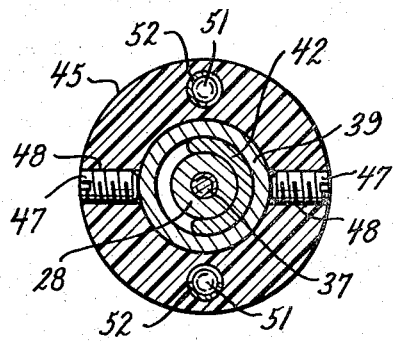
FIG. 5 is a cross sectional view taken along the line 5—5 in FIG. 2.
Figure 4:
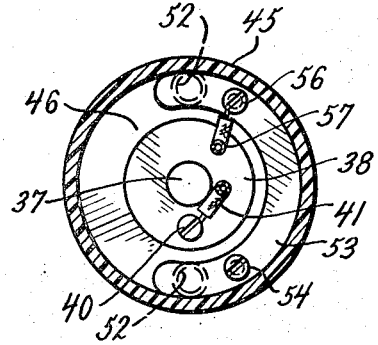
FIG. 4 is a cross sectional view taken along the line 4—4 in FIG. 2.
Figure 3:
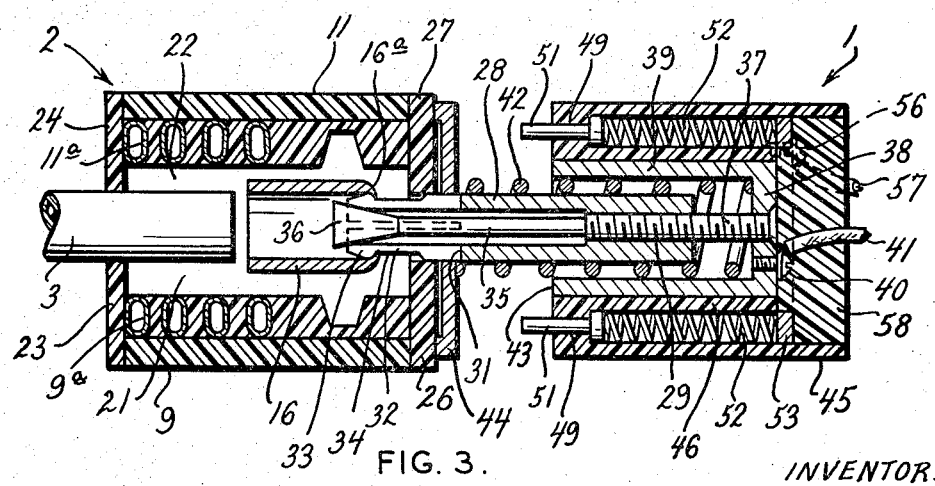
FIG. 3 is a longitudinal sectional view similar to FIG. 2, illustrating the union removal tool attached to a union just separated from a tube.

The heating component 2 (FIG. 1) is provided with pipe connections 17 and 18 adapted to supply high frequency electric energy from a suitable source, as well as cooling fluid which is circulated therethrough from a suitable source. The pipe connection 19 supplies an inert gas, such as argon. The pipes 17, 18 and 19 extend through the handle 7 to suitable internal distribution passages associated with hinge means 12 and the tube engaging jaw portions 9 and 11. The jaw portions 9 and 11 are formed (FIG. 2) to provide semi-cylindrical chambers 21 and 22, respectively, enclosing the union 16 as seen in FIGS. 2 and 3. Cooperating walls 23 and 24 on one end of the portions 9 and 11 have semicircular cut-outs which close about the tube 3 to enclose the union 16 from one end. The opposite end of the portions 9 and 11 have other end walls 26 and 27 formed with cooperating semi-circular cutouts which cooperate with the pulling component 1 presently to be described. The walls 26 and 27 may be of heavier gauge material so as to withstand a surface load without yielding to distortion.

In the manner described in said prior application Ser. No. 231,984, the conduit 19 supplies inert gas to the chamber 21 where it fills the two chambers 21 and 22 and expels the air therein as desired. Similarly the connection 17 extends into the portion 9 forming the series of flattened tubular heating elements 9A, and extends back into the region of the hinge means 12. Then connection 17 extends into the portion 11 to form with another series of flattened tubular heating elements 11A in portion 11, and extends back into hinge means 12 to join connection 18. The electric and fluid circuits are completed through a suitable connection in hinge means 12 with the connections 17 and 18. Thus, elements 9A and 11A form the heater means for heating the union-tubing workpiece within chambers 21 and 22, as well as for supplying a cooling fluid to cool the elements.

With reference to FIGS. 1 to 5, the pulling component 1 of the present tool includes a central tubular sleeve 28 having an internally threaded bore 29 at one end disposed within the component 1, and a plurality of circumferentially spaced longitudinal slots 31 in the opposite end portion that extend outwardly of component 1 to provide a plurality of exposed flexible fingers 32 thereon. Each finger has an enlarged end 33 outwardly of a reduced diameter portion forming an annular relief 34 adjacent the enlarged end. A pin housed in the sleeve 28 has one end provided with a cone shaped head 36 to cooperate with the fingers 32 for forcing the fingers apart or outwardly to expand the effective circumferential dimension of the enlarged ends 33. The opposite end 37 of pin 35 is threaded in the bore 29 of the sleeve 28 and passes through the sleeve and is fixedly mounted in the end wall 38 of an electrically conductive cylindrical housing 39. An electrical connector 40 secures a lead wire 41 to the end wall 38. The housing is larger than the tubular sleeve 28 to provide an annular space therebetween to receive an electrically conductive resilient biasing member 42. The open end 43 of the housing 39 is adapted to engage electrically conductive pressure disc 44 which is mounted to slide on the sleeve 28 whenever biasing member 42 is compressed sufficiently.

An insulating cylindrical casing sleeve 45, which has a counter-sunk, thick internal wall 46, is secured around the cylindrical periphery of the housing 39 by set screws 47, received in threaded bores 48. Internal wall 46 has diametrically opposed longitudinal stepped bores 49 which receive contact elements 51 and contact springs 52 that are secured within the longitudinal bores by a horseshoe shaped contact segment 53. The contact segment 53 is secured to the sleeve by a retainer screw 54, and has electrical connector 56 securing lead wire 57 to the contact segment 53. The contact elements 51 project out of stepped bores 49 of casing 45 and extend therebeyond. Thus, electrical continuity is provided from contact elements 51 to contact segment 53. Thus, housing 39 and contact elements 51, electrically connected to contact segment 53 will operate as removal tool switch S-2. The area in casing sleeve 45 adjoining internal wall 46 may be filled with potting material 58 having lead wires 41 and 57 extended therethrough.

Figure 6:
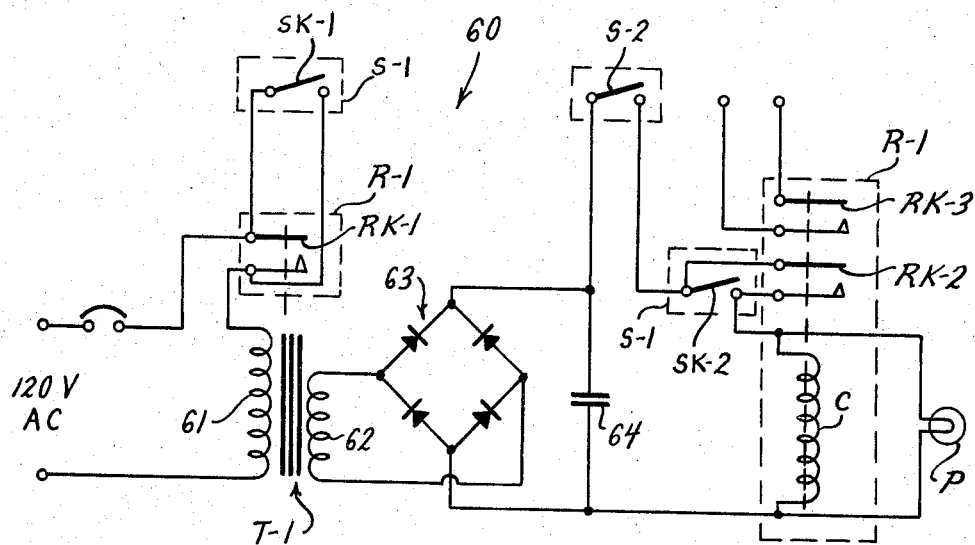
FIG. 6 illustrates the control circuit for the tool.

As seen in FIG. 6, a heating or power control circuit 60 for the composite tool employs the tool switch S-2 of pulling component 1 to allow activation of the heater control circuit 60 on command. The electric circuit 60 comprises a transformer T-1 which has a primary winding 61 and a secondary winding 62. A push button switch S-1, which is a normally open, double pole, single throw switch with contacts SK-1 and SK-2, connects the primary winding 61 of transformer T-1 through contact SK-1 across a 120 volt AC power line. The Secondary winding 62 is connected to a diode bridge rectifier 63 which has a capacitor 64 shunting the output of the bridge rectifier 63. One side of the juncture of the capacitor 64 and the bridge rectifier 63 is connected through the low voltage, removal tool switch S-2 in series with contact SK-2 of switch S-1 to coil C of relay R-1. The other side of Coil C is returned to the other output side of rectifier 63. Switch S-1, when the removal tool switch S-2 is closed, applies DC voltage across coil C of relay R-1 closing contacts RK-1, RK-2 and RK-3. The contacts RK-1 parallel contacts SK-1 of switch S-1 and when closed contacts RK-1 supply AC voltage to the primary 61 of transformer T-1. Contacts RK-2 of the relay R-1 act as holding contacts to by-pass contacts SK-2 of switch S-1. Contacts RK-3 of the relay R-1 close a power circuit to initiate operation of the heating cycle. A pilot light P is provided to indicate activation of the relay R-1.

In operating the composite tool, the pulling component 1 is secured to union 16 at the end of union 16 which has been previously cut off by a suitable tool (not shown). The cut end of union 16 is burred to form lip 16a. The pulling component 1 is adjusted by rotating casing sleeve 45, and consequently pin 35 relative to sleeve 28 to retract sleeve 28 so that fingers 32 do not engage cone head 39 and thus fingers 32 exhibit a minimum circumferential dimension. The tube union lips 16a are placed over cone head 39 and fingers 32 so that enlarged ends 33 register with lip 16a. The pulling component 1, is adjusted to move cone head 39 relative to sleeve 28 and against fingers 32 to expand the fingers with enlarged ends 33 firmly seated against lip 16a, hence, securing component 1 to union 16.

Once the pulling component 1 is secured to the union 16, the heating component is disposed over union 16 such that chambers 21 and 22 enclose the union 16. Next the heating component 2 is slid toward casing sleeve 45 to push pressure disc 44 against the end of housing 39 and compress the biasing member 42, thereby creating a thrust pressure on the end walls 26 and 27. Pressure disc 44 also engages contact elements 51 compressing springs 52 and closing the removal tool electrical switch circuit S-2. The heat component 2 is then clamped in position on the tube 3 with the cut portion of the union 16 disposed between the heater elements 9a and 11a. Cooling fluid is supplied to the connections 17 and 18. Also, a power circuit (not shown) has its high frequency alternating current output coupled to connections 17 and 18. The heater elements 9A and 11A are constructed of conducting material so that they produce heat by induction when energized with the high frequency alternating current. The system is capable of achieving the desired temperature of up to about 1900° F. which may be required to melt the brazing material in the union 16.

The power circuit includes a power relay which is connected through contacts RK-3 of relay R-1 of the heating control circuit 60. Thus, whenever contacts RK-3 are closed, the power circuit supplies high frequency alternating current to elements 9A and 11A.

With the pulling component 1 and heating component 2 secured about union 16 with pressure disc 44 engaging housing 39, the removal tool switch S-2 is closed and the removal tool is ready to initiate removal of the union 16 from tube 3. The push button switch S-1 then is momentarily closed and relay R-1 operates closing contacts RK-1, RK-2 and RK-3. This operation closes the power relay through contacts RK-3 which activates the power circuit to provide the high frequency alternating current output to elements 9A and 11A for heating union 16. During the heating cycle, inert gas is fed through connection 19 to the chambers 21 and 22 to displace the air and prevent oxidation. Likewise, cooling fluid is supplied through connections 17 and 18 to elements 9A and 11A. Upon the union 16 reaching the melting temperature of the brazing material, the compressed spring means 42 acting on pressure disc 44 will automatically slide the union 16 off the tube 3 (compare FIGS. 2 and 3). Concurrently, cylindrical housing 39 and casing sleeve 45 are forced to move away from pressure disc 44 causing the contact elements 51 to become disengaged from the pressure disc 44 and thereby opening the removal tool switch S-2 which interrupts the energizing circuit to relay R-1 causing contacts RK-1, RK-2 and RK-3 of the relay R-1 to open, and thus open the power circuit supplying current to the heater elements 9A and 11A. The tool may then be left on the tube 3 until cooling of the chambers 21 and 22 has reduced the temperature thereof to a level where oxidation will not occur and will not contaminate the tube.

Various changes and modifications in the present invention will be apparent to those skilled in the art, and such changes and modifications as will be readily apparent are deemed to be within the scope of the present invention as defined in the appended claims.

What is claimed is:

1. A union removal tool to heat brazed-on tube unions and remove the union from the tube comprising a pulling component having gripping means, a relatively movable electrically conductive pressure exerting means carried by said gripping means and exerting a force between said pressure means and said gripping means, and an electrical connector means secured to said gripping means, an insulative sleeve including an electrical contact means in the wall thereof for normally engaging said pressure means; and a heating component having a heating chamber including heater means adapted to enclose the union to be heated and removed, and having a wall for said chamber engaged by said pressure means, said gripping means moving relative to said heating chamber under the influence of said pressure exerting means upon heating of the union, said electrical contact means disengaging said pressure means during limited movement of said gripping means relative to said pressure exerting means to interrupt operation of said heating means.

2. A union removal tool to heat brazed-on tube unions and remove the union from the tube comprising a pulling component having gripping means, a relatively movable electrically conductive pressure means carried by said gripping means and exerting a force between said pressure means and said gripping means, and an electrical connector means secured to said gripping means, an insulative sleeve secured to said gripping means including an electrical contact means in the wall thereof, said contact means normally engaging said pressure means to provide electrical continuity between said connector means and said contact means; and a heating component having a heating chamber including heater means adapted to enclose the union to be heated and removed, and having a wall for said chamber engaged by said pressure means, said gripping means and said insulative sleeve moving relative to said heating chamber under the influence of said pressure means upon heating of the union, said electrical contact means remaining engaged with said pressure means during limited movement of said gripping means relative to said heating chamber to permit operation of said heating means.

3. A tube union removal tool including a body having an internal space and access openings thereto from the exterior, one of said access openings receiving a tube with a union brazed thereon which is to be removed, the union being located in said internal space, heating means carried by said body to heat the union in said internal space, an electrical circuit connected to energize the heating means, and a union pulling device comprising a union gripping member extending through another of said access openings from the exterior and gripping said union, and pulling means including an electrically conductive contact member carried by said gripping means and externally engaging said body, said pulling means including biasing means to move said gripping means relative to said contact member; electrical connector means insulatively carried by said pulling means adapted to engage said contact member initially and during a portion of the relative movement between said contact member and said pulling means, and an electrical coupling for said gripping means, said electrical connector and said electrical coupling providing electrical continuity through said contact member to control operation of said electrical circuit.

4. A tube union removal tool including a body having an internal space and access openings thereto from the exterior, one of said access openings receiving a tube with a union brazed thereon which is to be removed, the union being located in said internal space, means carried by said body to heat the union in said internal space, a control circuit connected to said means carried by said body to activate the heating thereof, and a union pulling device comprising a union gripping member extending through another of said access openings from the exterior and gripping said union, pulling means including an electrically conductive contact member carried by said gripping means and externally engaging said body, said pulling means including biasing means to move said gripping means relative to said contact member; electrical connector means insulatively carried by said pulling means adapted to engage said contact member during a portion of the relative movement between said contact member and said pulling means, and an electrical coupling for said gripping means, said electrical connector and said electrical coupling providing electrical continuity through said contact member, when said gripping member engages said union and during a portion of the separation of said union from said tube to permit operation of said control circuit for a limited interval.

5. An automatic tube union removal tool including a tube union heating member having walls enclosing and forming a heating chamber and encircling a union; a union removal component including an electrically conductive union gripping means disposed in said heating chamber and slidably through one wall thereof, electrical conductor means externally engaging said one wall and surrounding said gripping means, biasing means for moving said gripping means relative to said conductor means and separating the union from the tube upon heating the union, and an insulative housing secured to said gripping means, said insulative housing having a longitudinal bore, and an electrical contact means retained within said bore to engage said conductor means initially and during limited movement of said gripping means to provide electrical continuity from said contact means to said gripping means, a heat control circuit including said gripping means and said electrical contact means to limit activation of said heating member for a period sufficient solely to permit said biasing means to effect separation of the union from the tube.

6. An automatic tube union removal tool including a tube union heating member having walls enclosing and forming a heating chamber and encircling a union; a union pulling and removal component including an electrically conductive union gripping means disposed in said heating chamber and slidably through one wall thereof, electrical conductor means externally engaging said one wall and surrounding said gripping means, biasing means forcing said conductor means against said one wall for moving said gripping means relative to said one wall and separating the union from the tube upon heating the union, and an insulative housing secured to said gripping means, said insulative housing having an electrical contact means to engage said conductor means during a limited interval to provide electrical continuity from said contact means to said gripping means, a heat control circuit including said gripping means and said electrical contact means for activating said heating member to heat said tube union sufficiently to permit said biasing means to separate the tube union from the tube and thereafter to interrupt the heat control circuit.

References Cited
UNITED STATES PATENTS 3,240,912   3/1966   Schoppman _____ 219—7.5

RICHARD M. WOOD, *Primary Examiner.*

B. A. STEIN, *Assistant Examiner.*